United States Patent [19]

Irie

[11] 4,201,937
[45] May 6, 1980

[54] CONTROL APPARATUS FOR PROGRAMMABLE MANIPULATOR

[75] Inventor: Akiyoshi Irie, Himeji, Japan

[73] Assignee: Unimation, Inc., Danbury, Conn.

[21] Appl. No.: 894,562

[22] Filed: Apr. 7, 1978

[51] Int. Cl.² .................................... G05B 19/24
[52] U.S. Cl. .............................. 318/568; 318/573
[58] Field of Search ............... 318/568, 573; 364/107, 364/478; 214/1 CM

[56] References Cited

U.S. PATENT DOCUMENTS

| | | | |
|---|---|---|---|
| 3,890,552 | 6/1975 | Devol | 318/568 |
| 3,943,343 | 3/1976 | Irie | 318/568 |
| 3,970,831 | 7/1976 | Hegyl | 318/568 |
| 4,011,437 | 3/1977 | Hohn | 318/568 X |
| 4,086,522 | 4/1978 | Engelberger et al. | 318/568 |

*Primary Examiner*—B. Dobeck
*Attorney, Agent, or Firm*—Mason, Kolehmainen, Rathburn & Wyss

[57] ABSTRACT

Control apparatus is provided to control a programmable manipulator having a manipulator arm movable in a plurality of axes to perform a predetermined pattern of work operations in a replay cycle with respect to a movable workpiece while the workpiece is moving or is stationary at a point along a predetermined workpiece path. In replay, the control apparatus generates interpolation control signals from stored data in accordance with the workpiece position. The stored data includes two or more series of signals representing manipulator arm positions to accomplish the predetermined pattern of work operations with respect to the workpiece at two or more respective positions of the workpiece.

During replay, data is read out from the two series of signals that are associated with workpiece positions on either side of the present workpiece position. In one arrangement one signal is read out from each of the two series corresponding to the same sequential element in each series and representing the same point in the predetermined work operation pattern with respect to the workpiece. The sequential elements in the series are successively read out to perform the predetermined pattern of work operations with respect to the workpiece.

The control apparatus performs a linear interpolation operation between the signals from the two series and the present position of the workpiece.

The control apparatus in one embodiment includes a linear interpolation unit having a stage for developing a signal equal to the difference between the two signals, an arithmetic stage for multiplying the difference signal by 1/d where 1 represents the present workpiece position between the workpiece positions associated with the two series and d represents the distance between the respective workpiece positions associated with the two series, and a stage for combining the signal from the first series and the signal developed by the arithmetic stage.

30 Claims, 6 Drawing Figures

CONTROL APPARATUS FOR PROGRAMMABLE MANIPULATOR

BACKGROUND AND SUMMARY OF THE INVENTION

The present invention relates to control apparatus for programmable manipulators (industrial robots) of the type that perform predetermined work cycles with respect to movable workpieces.

Industrial robots or manipulators are generally used for increasing the efficiency of personnel and for saving manpower in existing facilities. In numerous situations the manipulator is required to perform a predetermined work cycle with respect to workpieces on a continuously moving conveyor.

In one arrangement of the prior art, a manipulator is mounted on a truck to be carried by the truck in synchronism with the movement of the workpiece to perform a work cycle in accordance with the program stored in the memory of the manipulator control apparatus. Thus, there is no change in the relative positions between the manipulator and the workpiece. In this arrangement, however, the truck is by necessity a bulky and rather massive mechanism. Further, complicated control apparatus is required to accomplish the precise movement of the manipulator and truck arrangement to follow the workpiece. Further, it is quite difficult to rapidly return the truck to the original position. In addition, the system requires a large space along the workpiece path.

In another apparatus of the prior art, the manipulator is fixedly positioned and has a working arm adapted to follow moving workpieces. When it is desired to move along a continuous trace on a workpiece, the moving position of the workpiece on the conveyor is preliminary memorized or taught together with the coordinate positions of each axis of the robot on the work cycle path or trace. In a replay or work cycle, the position of the workpiece is detected and corresponding stored coordinate values are sequentially read out for each axis of the robot. In this system, it is possible to perform a work cycle continuously on a moving workpiece and the working arm can be rapidly returned simply by storing the initial point as a command signal for the manipulator. However, since the positions of the workpiece and the positions of the manipulator arm are associated in a fixed relationship, it is difficult to continue a desired work cycle and to move along the predetermined path or trace at a predetermined working arm speed relative to the workpiece when there has been an abrupt change in the workpiece speed or when the workpiece has stopped. Thus, under such circumstances, it is extremely difficult to perform an arc-welding or painting operation.

Other prior art arrangements have been proposed to solve this problem by storing the coordinates of the manipulator arm with respect to the workpiece for the predetermined work cycle path, detecting the varying position of the workpiece during the replay of the work cycle, and transforming the stored coordinates of the manipulator through calculations in accordance with the detected workpiece position. However, such calculations are complicated, time consuming and require the use of a high speed computer. Therefore, the design is considered as relatively impractical.

Accordingly, it is a principal object of the present invention to provide control apparatus for a programmable manipulator or robot that avoids one or more of the disadvantages of the aforementioned prior art arrangements.

It is another object of the present invention to provide control apparatus for a robot or programmable manipulator wherein the manipulator performs a predetermined work cycle with respect to a moving workpiece in a continuous manner and at a predetermined speed with respect to the workpiece in spite of variable workpiece movement or stopping of the workpiece.

It is a further object of the present invention to provide a programmable manipulator for performing a predetermined work cycle with respect to a workpiece moving at a variable speed wherein positional data is stored during a teach phase representing a predetermined work cycle with respect to the workpiece for at least two respective workpiece locations, and the stored data utilized in replay to perform the predetermined work cycle with respect to the workpiece.

It is yet another object of the present invention to provide manipulator control apparatus for a programmed manipulator having a manipulator arm, the control apparatus generating interpolation command signals from stored data wherein the interpolation command signals account for the position and movement of a workpiece and are utilized to control movement of the manipulator apparatus to perform a predetermined work cycle with respect to the workpiece; the stored data is recorded during a teach phase and represents the manipulator arm positions to define the predetermined work cycle with respect to the workpiece at two or more locations of the workpiece along a predetermined workpiece path.

Briefly, in accordance with the present invention, there is provided control apparatus to control a programmable manipulator arm movable in a plurality of axes to perform a predetermined pattern of work operations in a replay cycle with respect to a movable workpiece while the workpiece is moving or is stationary at a point along a predetermined workpiece path. In replay, the control apparatus generates interpolation control signals from stored data in accordance with the workpiece position. The stored data includes two or more series of signals representing manipulator arm positions to accomplish the predetermined pattern of work operations with respect to the workpiece at two or more respective positions of the workpiece.

During replay, data is read out from the two series of signals that are associated with workpiece positions on either side of the present workpiece position. In one arrangement, one signal is read out from each of the two series corresponding to the same sequential element in each series and representing the same point in the predetermined work operation pattern with respect to the workpiece. The sequential elements in the series are successively read out to perform the predetermined pattern of work operations with respect to the workpiece.

The control apparatus performs a linear interpolation operation between the signals from the two series and the present position of the workpiece.

The control apparatus in one embodiment includes a linear interpolation unit having a stage for developing a signal equal to the difference between the two signals, an arithmetic stage for multiplying the difference signal by l/d where l represents the present workpiece position between the workpiece positions associated with the two series and d represents the distance between the respective workpiece positions associated with the two series, and a stage for combining the signal from the first series and the signal developed by the arithmetic stage.

The invention both as to its organization and method of operation thereof with further objects and advantages thereof will best be understood by reference to the following specification taken in connection with the accompanying drawings.

DESCRIPTION OF THE PREFERRED EMBODIMENT

Figures 1, 2:
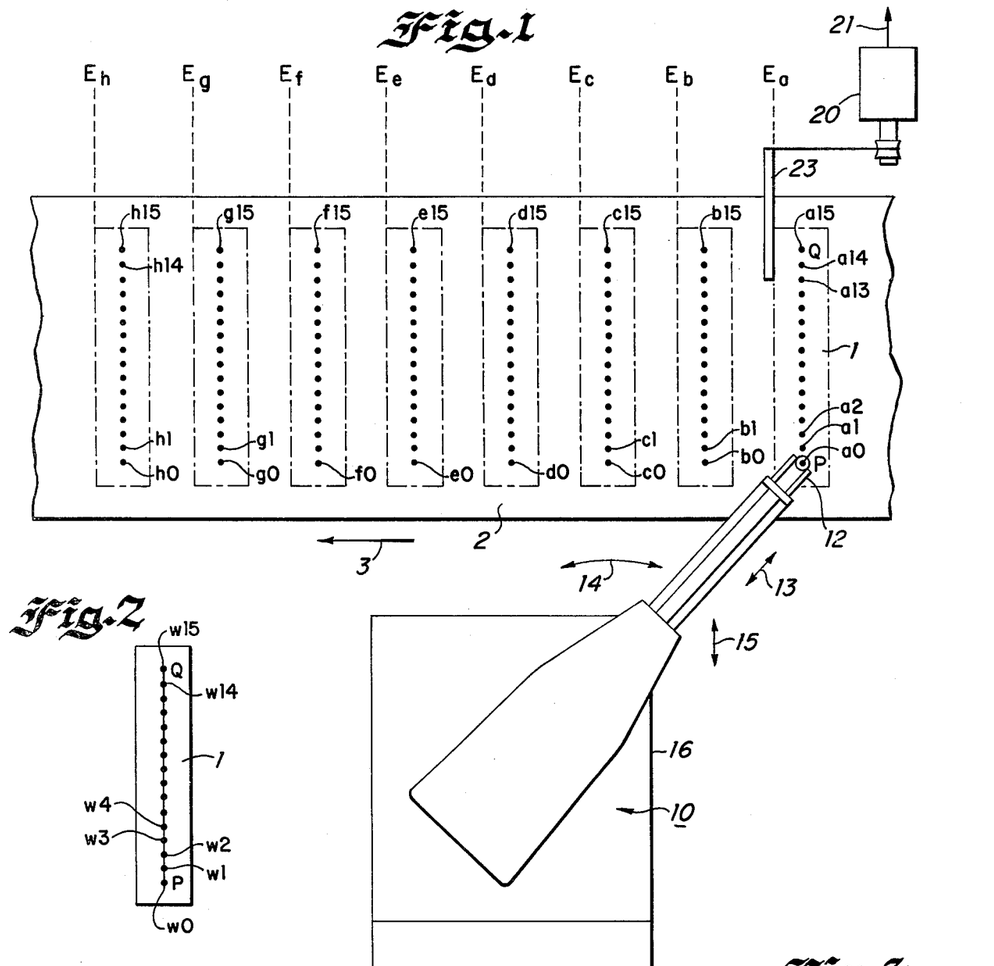
FIG. 1 is a diagrammatic plan view representation illustrating portions of a workpiece at various locations along a predetermined workpiece path and a manipulator apparatus for performing a predetermined work cycle or series of work operations with respect to the workpiece in accordance with the control apparatus of the present invention.
FIG. 2 is a diagrammatic plan view representation of the workpiece of FIG. 1 and further illustrating a predetermined work cycle path or trace defined on the workpiece.

Referring now to FIG. 1, a workpiece referred to generally at 1 is carried by a conveyor arrangement 2 along a predetermined workpiece path indicated generally by the direction arrow 3. A programmable manipulator or industrial robot 10 has a manipulator arm 11 with a working end or end effector 12 for performing work operations; e.g. the work path or trace PQ. The work path PQ is generally illustrative of the type of work path or series of work operations that is required in an arc-welding or painting operation although it should be understood that the present invention contemplates work paths and work operations of various types and geometries.

The manipulator arm 11 is controllable for movement in three axes or degrees of freedom; an X-axis illustrated by arrow 13 for in-out or longitudinal arm movement, a Y-axis illustrated by arrow 14 for rotary movement in a horizontal plane and a Z-axis illustrated by arrow 15 for the vertical or up-down movement. The manipulator 10 is fixedly mounted on a base 16. While a specific manipulator apparatus is discussed for illustrative purposes, it should be realized that the present invention contemplates the control of other types of manipulators; e.g. the manipulator disclosed in U.S. Pat. No. 3,661,051.

A conveyor position encoder 20 is provided that includes a detecting piece 23 for detecting the continuously changing position of the workpiece 1. The conveyor position encoder 20 develops an instantaneous position signal 21 comprising a digital signal of 9 data bit positions in a preferred embodiment.

In accordance with the recording of data during a teach phase, there is illustrated in FIG. 1 eight designated positions of the workpiece 1, Ea through Eh. In a specific embodiment and to facilitate discussion purposes, the positions Ea through Eh are spaced apart by equal, predetermined distances. However, it should be understood that the present invention contemplates one teach position of the workpiece in one alternative embodiment and in another alternative embodiment the random spacing of the workpiece positions all as will be explained in more detail hereinafter. In a specific embodiment, the positions Ea through Eh are spaced apart by 64 mm.

Referring now to FIG. 2, there are illustrated a series of sixteen points $w_0$ and $w_{15}$ on the respective work path or trace PQ along which the working end 12 moves to describe the predetermined work cycle with respect to the workpiece 1. These points are identified on the workpiece by suitable markers or other applied indicia for the teach phase. It should be understood that the substantially straight line segment work path PQ is illustrative and that work paths for the particular work operation including curved paths, paths of various other geometries, paths defined by a plurality of linear or curved segments and paths defined by any random set of connected points are all contemplated by the present invention.

The coordinates of the work path points $w_0$ through $w_{15}$ of the work path PQ are referred to respectively as a0 through a15 for the corresponding workpiece location Ea and similarly as b0 through b15—h0 through 15 for the respective Eb through Eh positions of the workpiece 1. The various sets of the work path points a0 through a15, b0 through b15,—h0 through h15 are also referred to as the work path data lines A through H, respectively, corresponding to the respective positions Ea through Eh.

Figure 3:
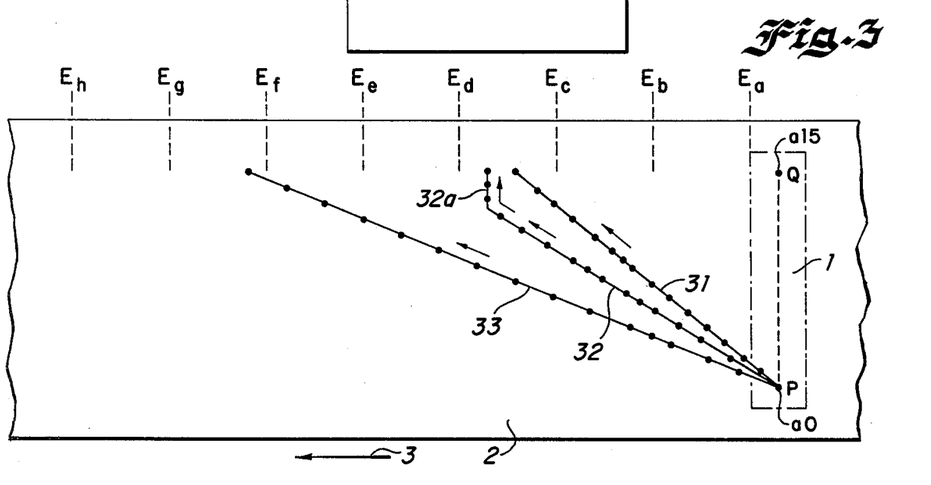
FIG. 3 is a diagrammatic plan view representation similar to FIG. 1 and illustrating several typical work paths or traces described by the end effector of the manipulator apparatus corresponding to various movements of the workpiece along the predetermined workpiece path.

Referring now additionally to FIG. 3, the paths 31, 32 and 33 illustrate the movement of the working end 12 of the manipulator arm 11 for various corresponding speeds of the conveyor 2. For example, the speed of the working end 12 along the work path is constant from the starting point P to the end point Q relative to the workpiece 1 and the working end 12 moves along the path 31 when the conveyor 2 moves at a relatively low constant speed, along the path 32 at a medium or nominal constant speed and along the path 33 at a relatively high constant speed. The end portion 32a of the path 32 is described by the working end 12 when the conveyor 2 stops. Further, if the conveyor does not move at a constant speed, the path described by the working end 12 will vary accordingly and be modified from a straight path.

Figures 4, 5:
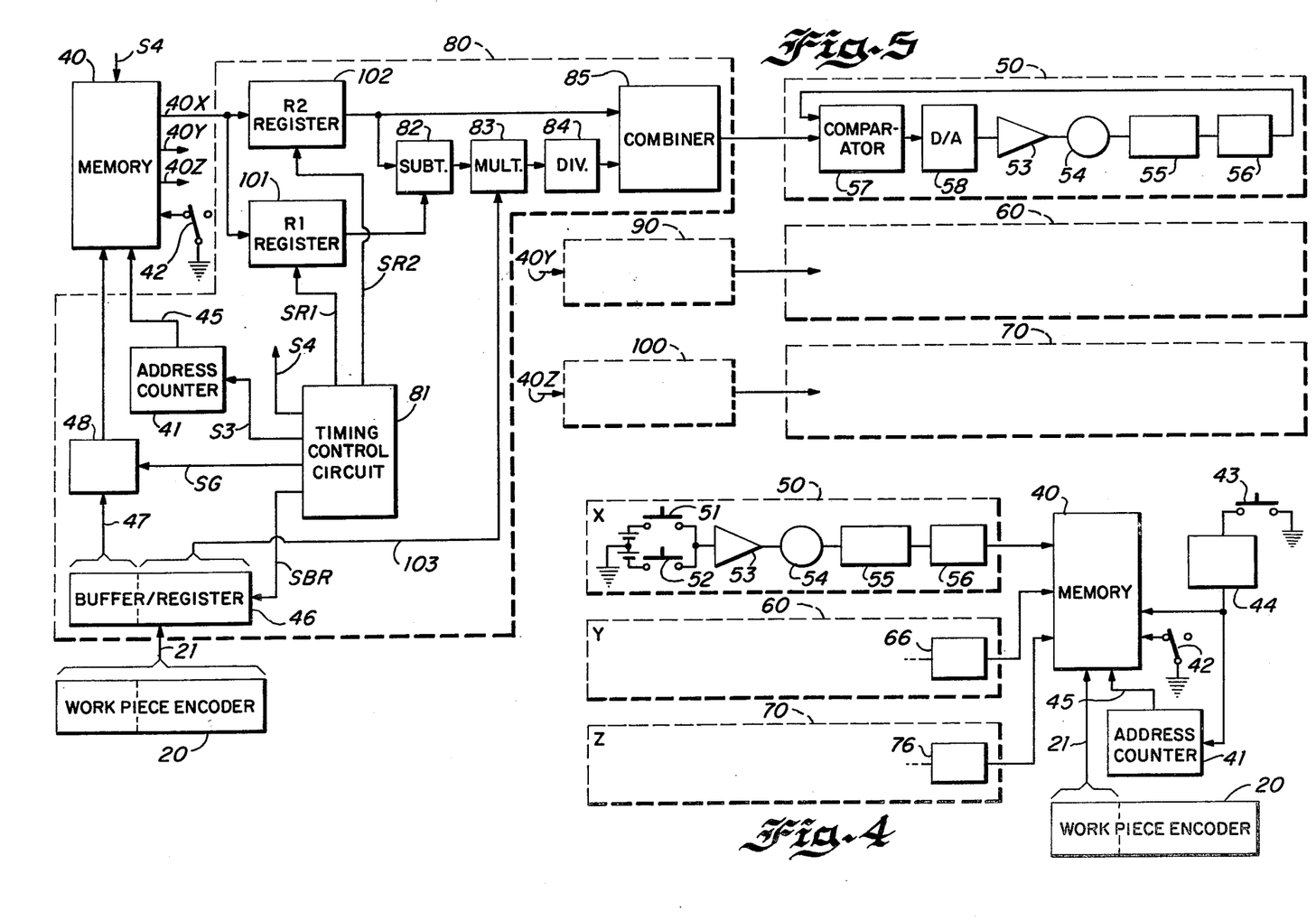
FIG. 4 is a block diagram of the control apparatus of the present invention utilized in a teach phase.
FIG. 5 is a block diagram of the control apparatus of the present invention utilized in a replay or repeat mode to perform the work cycle.

Considering now the teaching phase and referring to FIG. 4, the workpiece 1 in a specific embodiment is positioned at the designated positions Ea through Eh, and at each position the working end 12 of the manipulator 10 is sequentially moved to describe a path through the coordinate locations a0 through a15, b0 through b15—h0 through h15 to store positional data for each of the manipulator axes in a memory 40 to establish the recorded data points illustrated in Table 1.

Table 1

| Designated position | Data Line | Co-ordinates position | Higher 3 bits in output 21 of encoder 20 | Output 41 of address counter 41 | Axis Conditions (co-ordinates value) | | |
|---|---|---|---|---|---|---|---|
| | | | | | X-axis | Y-axis | Z-axis |
| | | a0 | 0 0 0 | 0 0 0 0 | ax 0 | ay 0 | az 0 |
| | | a1 | 0 0 0 | 0 0 0 1 | ax 1 | ay 1 | az 1 |
| Ea | A | a2 | 0 0 0 | 0 0 1 0 | ax 2 | ay 2 | az 2 |
| | | . | . | . | . | . | . |
| | | . | . | . | . | . | . |
| | | a15 | 0 0 0 | 1 1 1 1 | ax 15 | ay 15 | az 15 |
| | | b 0 | 0 0 1 | 0 0 0 0 | bx 0 | by 0 | bz 0 |
| | | b 1 | 0 0 1 | 0 0 0 1 | bx 1 | by 1 | bz 1 |
| Eb | B | b 2 | 0 0 1 | 0 0 1 0 | bx 2 | by 2 | bz 2 |
| | | . | . | . | . | . | . |
| | | b15 | 0 0 1 | 1 1 1 1 | bx 15 | by 15 | bz 15 |
| | | c 0 | 0 1 0 | 0 0 0 0 | cx 0 | cy 0 | cz 0 |
| | | c 1 | 0 1 0 | 0 0 0 1 | cx 1 | cy 1 | cz 1 |
| Ec | C | c 2 | 0 1 0 | 0 0 1 0 | cx 2 | cy 2 | cz 2 |
| | | . | . | . | . | . | . |
| | | c15 | 0 1 0 | 1 1 1 1 | cx 15 | cy 15 | cz 15 |
| Ed | D | d 0 | 0 1 1 | 0 0 0 0 | dx 0 | dy 0 | dz 0 |
| | | d 1 | 0 1 1 | 0 0 0 1 | dx 1 | dy 1 | dz 1 |
| | | . | . | . | . | . | . |
| | | . | . | . | . | . | . # |
| Eg | G | g15 | 1 1 0 | 1 1 1 1 | gx 15 | gy 15 | gz 15 |
| | | h 0 | 1 1 1 | 0 0 0 0 | hx 0 | hy 0 | hz 0 |
| | | h 1 | 1 1 1 | 0 0 0 1 | hx 1 | hy 1 | hz 1 |
| Eh | H | h 2 | 1 1 1 | 0 0 1 0 | hx 2 | hy 2 | hz 2 |
| | | . | . | . | . | . | . |
| | | h15 | 1 1 1 | 1 1 1 1 | hx 15 | hy 15 | hz 15 |

The memory means 40 in a specific embodiment is a random access type memory. The conveyor encoder 20 is a binary absolute value type having a 9-bit digital output 21. The output 21 increases from "000000000" bit by bit as the workpiece 1 moves each predetermined displacement unit, one mm in a specific embodiment, from the designated position Ea to the position Eh. Thus, when the workpiece 1 is at the designated positions Ea, Eb-Eh, the most significant three bits are "000", "001"-"111" respectively. The remaining lower six bits of the output 21 are binary coded and increase from "000000" one by one as the workpiece 1 moves each predetermined displacement unit for example from the position Ea to the position Eb between the designated positions. When the teach locations are equally spaced, the most significant three bits are utilized as a memory address signal for each work path set or data line and the lower six bits are utilized for correct positioning of the workpiece at the teach positions. If the teach positions Ea through Eh are not equally spaced, the entire 9-bit output 21 is recorded for each teach position; a separate 3-bit data line address counter being utilized to address the memory 40 and being advanced at each teach position.

A work path point (series element identifier w0 through w15) address counter 41 produces a 4-bit binary coded output 45 that is advanced in count by an advance control 43 as the working end 12 is moved between the work path position w0 through w15 on the workpiece 1 at each designated workpiece position Ea, Eb-Eh; for example, at the Ea workpiece position from a0 to a15.

To record data in the teach phase, a memory mode control switch 42 is actuated to condition the memory 40 to a "write-in" mode and the manipulator arm positions for the points a0 through a15 referred to as data line A (refer to Table 1) are stored in the memory 40 as the working end 12 is moved along the path w0 through w15. In the teach phase, three hydraulic servo mechanisms 50, 60 and 70 for the x-axis, y-axis and z-axis respectively are actuated to move the working end 12 over the work path at the various teach locations although it should be understood that other position control systems may also be utilized. As the working end 12 is moved to the point a0, coordinate data ax 0, ay 0 and az 0 is stored in the memory 40. The address selection of the axis coordinates ax 0, ay 0 and az 0 representing a0 is performed by the combination of the higher three bits "000" of the output 21 of the encoder 20 and the preset initial output "0000" of the address counter 41.

In the x-axis hydraulic servo mechanism 50, the in-out longitudinal movement of the arm 11 is controlled by two manual teach controls 51 and 52. The two teach controls 51 and 52 are connected to a control amplifier 53 to operate a servo valve 54. The servo valve 54 actuates a hydraulic cylinder 55. An x-axis encoder 56 is provided to develop positional data representing the position of the working end 12 in the x-axis; coordinate ax 0 for the a0 position.

Similarly, y-axis and z-axis encoders 66 and 76 develop the axis coordinates ay 0 and az 0, respectively. Upon completion of the storage of the axis coordinates at the location a0, the servo mechanisms 50, 60 and 70 are actuated to move the working end 12 to the next location a1, and the axis conditions ax 1, ay 1 and az 1 at this location are stored in the memory 40. The address of the a1 data is determined by the higher three bits "000" of the encoder 20 and the output "0001" of the address counter 41 advanced by a pulse signal applied from a mono-stable circuit 44 controlled by the advance control 43. Thus, the advance control 43 is actuated to sequentially select the axis conditions corresponding to the locations a 2, a 3,—a 15 so as to store them in the memory 40. Upon the writing into the memory 40 of the data from the points a0-a15, the teaching of the data line A is completed.

A similar teaching and storing operation is then performed with respect to the data line B wherein the positional data for the points b0 through b15 in each of the axes x, y and z is stored in the memory 40. The teach phase continues until the manipulator arm positions are stored for the points w1 through w15 on the workpiece 1 at each of the workpiece locations Ec through Eh corresponding to the data points c0-c15 through h0-h15. After the data lines A through H have been taught and stored, the contents of the Table 1 are stored in the memory 40.

In replay and when the workpiece 1 is for example between the designated positions Ea and Eb, linear interpolation operations are performed in accordance with the present invention as described by the following equations (1) through (3) and the stored data a0-a15 and b0-b15 to account for the workpiece position in replay and to perform the pattern of work operations, work path PQ. The interpolation operation described by equations (1) through (3) develops the interpolated coordinate values $abx_i$, $aby_i$ and $abz_i$ of the location $ab_i$; the point $ab_i$ corresponds to the point $w_i$ ($i=0$ to 15) on the work path PQ accounting for the workpiece position Eab. In equations (1) through (3), the distance between the designated positions Ea and Eb is referred to as d and the letter l designates the position Eab of the workpiece 1 along the direction 3 from the designated position Ea, i.e. the distance l (the lower 6 bits of the encoder output 21) represents the exact position of the workpiece 1 between the workpiece positions Ea and Eb.

$$abx_i = ax_i + \frac{bx_i - ax_i}{d} \times 1 \quad (1)$$

$$aby_i = ay_i + \frac{by_i - ay_i}{d} \times 1 \quad (2)$$

$$abz_i = az_i + \frac{bz_i - az_i}{d} \times 1 \quad (3)$$

Similar interpolation operations are performed when the workpiece 1 is between two other designated positions. For example, when the workpiece 1 is at a position Ebc between the designated positions Eb and Ec, the interpolated coordinate values $bcx_i$ for the x axis can be obtained from the following equation (4). In this equation (4), the character $l_1$ represents the distance from the designated position Eb at a particular point in the replay cycle to the workpiece position Ebc.

$$bcx_i = bx_i + \frac{cx_i - bx_i}{d} \times 1_l \quad (4)$$

Such interpolation operations are performed in accordance with the above equations (1) through (3) as i varies sequentially from 0 through 15 in the specific embodiment where 16 workpiece points define the predetermined work path; i.e. the pattern of work operations. In accordance with the control of the interpolation operations, i is advanced in the sequence by one integer at predetermined time intervals $T_1$. During the time interval $T_1$, the working end 12 of the manipulator arm 11 moves along the work path from one of the designated points $w_i$ in the sequence of w0 through w15 to the next adjacent point wi+1; the working end 12 moves sequentially over the designated points w0 through w15 to describe the work path PQ relative to the workpiece 1. The hydraulic axis servo mechanisms 50, 60 and 70 control the movement of the manipulator 10 in the controlled axes in accordance with these interpolated coordinate values so as to bring the working end 12 to a position and orientation corresponding to the interpolated values. In this regard, it should also be understood that incremental control systems may also be utilized to control movement of the manipulator.

Figure 6:
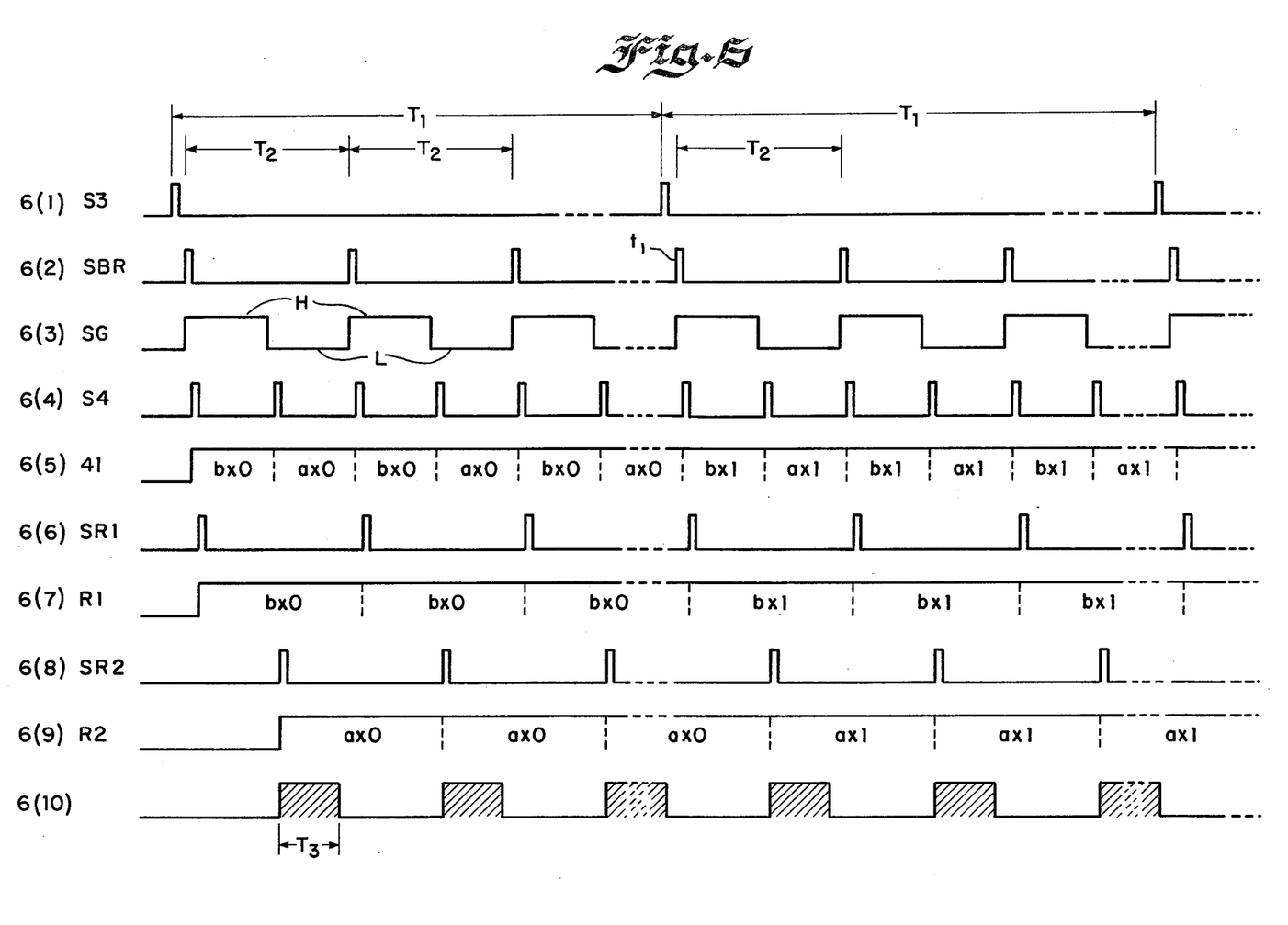
FIG. 6 is a diagrammatic representation of waveforms of various signals in the control apparatus of FIGS. 4 and 5.

Considering now the details of the replay operation and referring to FIGS. 5 and 6, the memory mode control switch 42 is positioned to condition the memory 40 to a "read-out" mode. Assuming that the replay cycle begins with the workpiece 1 positioned between the positions Ea and Eb, the encoder output 21 of the workpiece conveyor encoder 20 is "000" for the most significant three bits and the lower six bits are "001010" for example to represent a distance l equal to 10 predetermined displacement units and encoder bits, 10 times 1 mm or 10 mm in the specific embodiment where each encoder bit output represents a displacement of 1 mm. The encoder output 21 is entered into a buffer register 46. The most significant three bits of the buffer register 46 are connected at 47 to a gate 48 under the control of transfer command pulses SBR from a timing control circuit 81. The waveform of the transfer command pulses SBR is shown in FIG. 6 (2). The output of the gate 48 is connected to address the memory 40. The gate 48 receives a gate control signal SG from the control circuit 81 having a waveform as shown in FIG. 6 (3) and functions to add 1 binary number to the output at 47 from the buffer register 46 when the gate control signal SG is at a high H-level. The gate passes the data bits at output 47 unchanged when the gate pulse SG is at a low L-level.

During the H-level interval of the signal SG, the output at 47, "000" for example, is increased by 1 resulting in an address input "001" to the memory 40 corresponding to the data line A. A memory address input of "001" corresponds to and selects the data line B as shown in Table 1; the series of coordinate positions b0 through b15.

The preset initial value "0000" of the address counter 41 is increased by 1 upon each occurrence of a timing pulse s3 generated by the control circuit 81, waveform shown in FIG. 6 (1). Thus, the output 45 of the address counter 41 controls the sequential selection of the coordinate positions or points along the work path PQ; e.g. the points a0 through a15,—h0 through h15 corresponding to the designated points w0 through w15 on the trace PQ at the respective Ea through Eh positions. The timing pulse 53 is generated at each predetermined time interval T1.

The work path set (data line) address signal at the output of the gate 48 equal to "001" during the H-level portion of the SG pulse signal and the work path point (series element) address signal output 45 of the address counter 41 equal to "0000" are used to select the address of the coordinate point b0 stored in the memory 40, table 1. Thus, the stored coordinate bx0 for the x-axis is read out of the memory 40 on the x-axis memory output under the control of a clock pulse s4 generated by the timing control circuit 81, FIG. 6 (4). The clock pulse s4 is generated at a frequency equal to twice that of the SG signal. The x-axis coordinate bx0 at the x-axis output shown in FIG. 6 (5) is stored in an R1 register 101 upon the occurrence of a control pulse signal SR1 generated by the timing control circuit 81 at the occurrence of alternate s4 control pulses. The contents bx0 of the R1 register 101 is illustrated in FIG. 6 (7).

When the gate pulse signal SG (FIG. 6 (3)) is at the low L-level, the work path set address signal at the output of the gate 48 equal to "000" is supplied together with the work path point address signal 45 of the address counter 41 equal to "0000" to select the address of the point a0. Under the control of a control pulse signal SR2 shown in FIG. 6 (8) and generated by the timing control circuit 81, the x-axis coordinate value ax0 from the x-axis output of the memory 40 is stored in an R2 register 102. The contents of the R2 register 102 is shown in FIG. 6 (9). The control pulse signal SR2 is generated upon the occurrence of alternate clock pulses s4 and intermediate the SR1 signals.

On the basis of the bx0 data in the R1 register 101 and the ax0 data in the R2 register 102, an interpolation operation is performed in accordance with the interpolation equation (1) with i=0 during a time interval T3, FIG. 6 (10). A subtracting unit 82 includes as inputs the outputs of the R1 register 101 and the R2 register 102 and is effective to develop a difference signal equal to (bx0−ax0). The difference signal is connected to one input of a multiplier stage 82. The multiplier 83 is operative to multiply the difference signal (bx0−ax0) at the output of the subtracting unit 82 by the quantity 1, the lower six-bit workpiece position output 103 from the buffer register 46, for example the signal "001010" corresponding to the distance l of the workpiece 1 equal to 10 displacement units past the position Ea. The output of the multiplier 83, (bx0−axo) 1 is connected to the input of a divider stage 84 that divides the input by a quantity representing the distance d between the designated positions Ea and Eb; the resultant quotient (bx0−ax0) 1/d is connected to one input of a combiner stage. A second input of the combiner stage 85 is connected to the output 85 of the R2 register 102 equal to ax0. The output of the combiner stage 85 represents the coordinate position abx0, the interpolated position signal representing the x-axis coordinate of the workpiece point w0 at the present position of the workpiece 1, a distance l between the position Ea and Eb.

The output of the combiner stage 85 is connected to an input of a comparator stage 57 of the x-axis hydraulic servo mechanism 50. The comparator stage 57 also includes a second input connected to the output of the x-axis encoder 56. The output of the comparator 57 is connected to a digital-to-analog converter stage 58. The analog output of the digital-to-analog converter stage 58 is connected to the control amplifier 53 that controls the servo valve 54. Thus, the servo valve 54 is operated to actuate the cylinder 55 until the difference between the inputs of the comparator stage 57 is zero or below a predetermined level. Accordingly, the working end 12 is moved to a position corresponding to the x-axis coordinate value abx0.

Similarly, two interpolation control circuits 90 and 100 for the Y and Z-axes respectively perform the interpolation operations in accordance with the equations (2) and (3) and the Y-axis and Z-axis outputs of the memory 40. Thus, the working end 12 is moved to the coordinate position abx corresponding to the x, y and z-axes coordinate values abx0, aby0 and abz0.

The above interpolation operation is repeated during every interpolation period T2 of the SBR pulse signal within the overall interval T1 (FIG. 6(1)) defined by the timing pulse s3. The time interval or cycle T1 is so determined that it is equal to or longer than the time required for the working end 12 to move on the trace PQ between two adjacent designated points in the series of work path points w0 through w15; e.g. between the points w0 and w1. Therefore, the working end 12 will reach the next designated point in the series of work path points within the time interval T1. In the above example, the working end 12 reaches the interpolated point ab0 within the time interval T1.

At the time t1, FIG. 6 (2), corresponding to the start of the second T1 cycle or time interval, the interpolated point ab1 corresponding to the next designated point w1 is generated by advancing the address counter 41 upon the occurrence of the s3 signal; assuming that the position of the moving workpiece 1 as detected by the conveyor encoder 20 is between the Ea and Eb positions. Thus, the working end 12 is moved to the point ab1 during the next second T1 cycle.

In an alternative embodiment, the aforementioned interpolation is performed between the points ax(i) and bx(i+1) for example between a0 and b1 to define the point a0b1. Thus, interpolation is performed to account for workpiece position and movement and simultaneously to move along the work path PQ. The interpolation to account for workpiece position is performed in accordance with the output 21 of the encoder 20 and the interpolation along the work path PQ is performed at equal time intervals. This alternative embodiment would be utilized for continuous movement work paths rather than point to point work patterns such as spot welding.

In the above designation, the time interval T1 of the timing signal s3 is described as a constant throughout the movement of the working end 12 over the designated points w0 through w15 on the trace PQ. However, when it is desired to change the arc welding time, for example due to a change in the thickness of a steel plate on the workpiece, the interval T1 of the timing pulses s3 may be changed to vary the speed of the working end 12 in accordance with the particular designated point in the series of work path points at which the thickness increases.

In order to minimize positional errors of the working end 12 which may occur during replay, an interpolation operation may be performed in a polar coordinate system for the control of the manipulator 10 including axes arranged in a polar coordinate system. Further, the number of the designated points on the trace PQ may be increased as required and the distance d between the designated positions along the moving path of the workpiece 1 may be decreased. In order to provide an increased capacity of memory with a lower cost, it may be desirable to use a random access memory in combination with a magnetic drum.

The teaching operation may be simplified by an arrangement wherein the axes conditions are manually taught and stored with respect to the designated points on the work path PQ with the workpiece 1 at the designated point Ea to provide the data line A; the remaining data lines B through H being calculated from the coordinate point data a0 through a15 of the data line A through off-line calculation procedures by a computer. The calculated points for data lines B through H are stored in the memory.

Specifically, the coordinate data points b0 through b15—h0 through h15 corresponding to the respective workpiece positions Eb through Eh are calculated from the a0 through a15 coordinate data obtained at the workpiece teach position Ea. The calculations are performed by first transforming the manipulator arm coordinate data of each of the coordinate points a0 through a15 into a generalized coordinate system, translating the generalized z-coordinate component (for an x axis workpiece path) of each of the coordinate points a0 through a15 by the positional displacement of the workpiece between the workpiece positions Eb and Ea, and again transforming the resultant generalized, translated coordinate point data back to the manipulator arm coordinate system to obtain the coordinate points b0 through b15. The coordinate points b0 through b15 represent the manipulator arm positions at the workpiece position E6 corresponding to the work path PQ, w0 through w15, with respect to the workpiece. Similarly, the c0 through c15—h0 through h15 coordinate points are obtained by translating the a0 through a15 coordinate point data by the workpiece positional displacements between the respective workpiece positions Ec through Eh and the teach workpiece position Ea.

The calculations described assume a manipulator arm coordinate system different than the cartesian coordinate system (orthogonal x, y and z axes) and also assume that the predetermined workpiece path motion (conveyor) is along the x axis. It should be understood that appropriate coordinate transformation operations for any manipulator coordinate system and any generalized coordinate system are possible and are contemplated by the present invention.

If the predetermined workpiece path motion is along coordinate directions other than the x axis, appropriate translation of the generalized coordinate data is performed to account for the change in workpiece position in one or more other axes. If the manipulator axes are arranged in a generalized cartesian coordinate system or other arrangement wherein the manipulator arm axes are independent of each other (not interrelated or interdependent), the calculations to obtain the coordinate points b0 through b15—h0 through h15 from the coordinate points a0 through a15 are performed by a translation step in the manipulator axes coordinate system. Thus, no coordinate transformation step would be necessary, assuming that the workpiece path motion (conveyor) is defined in terms of the manipulator axes coordinate system.

For a more detailed discussion of coordinate transformation operations and the translation of coordinate data to account for a change in workpiece position, reference may be made to U.S. application Ser. Nos. 625,932 filed by J. F. Engelberger et al on Oct. 28, 1975 and 721,805 filed by J. F. Engelberger et al on Sept. 8, 1976.

The interpolation control circuits 80, 90 and 100 may be of such type that operations are performed in a time division multiplex arrangement. With this arrangement, only one interpolation control circuit is required to perform the interpolation for all the manipulator axes. The time required to perform the aforementioned interpolations is relatively short; thus the use of a time division multiplexed interpolation control circuit for all manipulator axes does not present any problems as to the speed of the replay operations.

In the above discussion, the workpiece 1 is movable in one direction along the x-axis and the speed of movement is variable. According to the present invention, it is contemplated that the working end 11 will be moved along the work path PQ at a predetermined speed even when the movement of the workpiece is variable in speed and also in direction. For example, where the workpiece path is along the x and y-axis directions, an x-direction workpiece conveyor encoder and a y-direction workpiece conveyor encoder are utilized to control the output 21 of the encoder 20. The teaching phase is performed by placing the workpiece at designated positions as defined by the coordinate values in x and y-directions, and the address is designated during replay by detecting the position of the workpiece in terms of the x and y coordinate values by the x and y-direction encoders.

As described above and according to the present invention, it is possible to maintain a predetermined constant working speed of a manipulator end effector moving along a predetermined work path on a workpiece even when there are variations in the speed and direction of movement of the workpiece or when the workpiece is stopped.

While there has been illustrated and described several embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. In a programmable manipulator having a manipulator arm movable in a plurality of axes, control apparatus for controlling the movement of the manipulator arm to describe a predetermined work operation with respect to a workpiece capable of movement along a predetermined path, said control apparatus comprising:
   means for storing two or more series of command signals, each of said series of command signals representing the same series of points along the predetermined work operation with respect to the workpiece at respective positions of the workpiece;
   means for generating a workpiece position signal representing the position of the workpiece along the predetermined path;
   means responsive to said workpiece position signal and the two series of command signals that correspond to the two respective workpiece positions on either side of said workpiece position signal for generating interpolation control signals accounting for workpiece position;
   means for controlling said interpolation signal generating means to successively interpolate between said two series of command signals along said series of points; and
   means responsive to said interpolation control signals for moving said manipulator arm.

2. The control apparatus of claim 1 wherein said workpiece position signal generating means comprises means for generating a first position signal corresponding to said respective workpiece positions of said stored series of command signals and means for generating a second position signal corresponding to the workpiece position between successive ones of said first position signals.

3. The control apparatus of claim 1 wherein each of said series of command signals comprises a predetermined number n of data points $\Sigma j_i$ along the predetermined work operation with respect to the workpiece, where i varies from o to n and j represents a series of command signals corresponding to a respective workpiece position.

4. The control apparatus of claim 3 wherein said interpolation signal generating means comprises:

means for generating a difference signal $(j+1)_1-j_i$;

means responsive to said difference signal for generating an interpolated difference signal $(j+1)_i-j_i$ multiplied by $1/d$ where $1$ is the difference between the workpiece position signal and the respective workpiece position corresponding to the series $\Sigma j_i$, and $d$ represents the distance between the respective workpiece positions of the two series of command signals $\Sigma(j+1)_i$ and $\Sigma j_i$; and means for combining said interpolated difference signal and the first series signal $j_i$.

5. The control apparatus of claim 1 wherein said interpolation signal generating means is responsive to one command signal from each of said two series, said command signals corresponding to the manipulator arm positions representing the same position relative to said workpiece at two difference workpiece locations.

6. The control apparatus of claim 1 wherein said interpolation signal generating means is responsive to one stored command signal from each of said two series representing the same sequential element in each of said series.

7. The control apparatus of claim 1 wherein said interpolation signal generating means interpolates between the same sequential elements of each of said two series in said predetermined work operation, said controlling means comprises means for advancing said interpolation signal generating means to interpolate between the two command signals representing the next sequential element in each of said two series.

8. The control apparatus of claim 7 wherein said advancing means comprises means for generating an advance signal to said interpolation signal generating means at predetermined intervals.

9. The control apparatus of claim 8 wherein said predetermined intervals are equal.

10. The control apparatus of claim 7 wherein said controlling means further comprises means for determining a predetermined number of interpolation periods during which said interpolation signal generating means interpolates between the same sequential elements of said two series.

11. The control apparatus of claim 1 further comprising teach means operative in an initial teach phase for developing said series of command signals at one or more workpiece positions as said manipulator arm is moved through said series of points defining the predetermined work operation.

12. The control apparatus of claim 11 further comprising means for calculating a series of manipulator arm position signals different than those to which said manipulator arm is moved during said initial teach phase and corresponding to the manipulator arm positions defining said predetermined work operation with respect to said workpiece at a workpiece position different than the workpiece position in said teach phase.

13. The control apparatus of claim 12 further comprising means for storing said calculated series of manipulator arm positions in said storing means for two or more workpiece positions.

14. The control apparatus of claim 1 wherein said interpolation signal generating means interpolates between two position signal representing sequential elements of each of said series corresponding to the same point in said predetermined work operations with respect to said workpiece, said interpolation signal generating means comprising means for generating a position signal in each axes of said manipulator arm representing the same position relative to the workpiece as said two position signals and accounting for workpiece position.

15. The control apparatus of claim 1 wherein said interpolation signal generating means comprises modification means for interpolating between a position signal from each of said two series representing the same point relative to said workpiece at respective workpiece positions and for developing a position signal representing the same point relative to said workpiece as said two position signals and corresponding to the workpiece position generated by said workpiece position signal generating means.

16. The programmable manipulator of claim 1 wherein said controlling means comprises means for alternately controlling said storage means to read out a command signal from said first series during a first predetermined time interval and a command signal from said second series during a second predetermined time interval.

17. The programmable manipulator of claim 2 wherein said series of command signals are stored in said storage means in an addressable sequence and assigned an address location determined by said first position signal.

18. The programmable manipulator of claim 17 wherein said controlling means comprises means for alternately controlling said storage means to read out a command signal from a first of said two series associated with an address location corresponding to said first position signal and a command signal from the second of said two series.

19. The programmable manipulator of claim 18 wherein said address location is equal to said first position signal and is incremented by one address location for each of said stored series, said alternate controlling means comprising means for addressing said storage means with said first position signal during a first predetermined time interval and addressing said storage means with a signal equal to one successive address location above said first position signal during a second predetermined time interval.

20. The programmable manipulator of claim 1 wherein said series of command signals are stored in said storage means in a predetermined relationship in accordance with an address defining an address location.

21. The programmable manipulator of claim 20 wherein said address comprises a first address determined by said workpiece position signal and representing a respective one of said series of command signals and a second address representing each of the points within said series.

22. The programmable manipulator of claim 21 wherein said controlling means comprises means for selectively incrementing said first address by one address location to alternately read out command signals from said two series.

23. The programmable manipulator of claim 22 wherein said interpolation signal generating controlling means comprises means for generating said second address signal and incrementing said second address signal by one address location at predetermined intervals of time.

24. The method of programming and controlling the operation of a programmable manipulator provided with an arm movable in a plurality of axes and having an encoder for each axis to develop position signals to perform a predetermined work operation with respect to a workpiece whether the workpiece is continuously moving along a predetermined path or is stationary at any position along the predetermined path, the workpiece including an encoder to develop position signals, the method comprising the steps of:

moving said arm during a teaching operation to different positions with respect to the workpiece to describe the predetermined work operation at one or more positions of the workpiece along the predetermined path;

calculating command signals from the position signals developed by the encoders for each axis of the manipulator arm that represent arm positions different than the positions during the teaching operation and represent the predetermined work operation with respect to the workpiece at a workpiece position different than the workpiece position during the teaching operation;

storing the command signals calculated during said calculating step in a predetermined relationship with respect to the corresponding workpiece positions; and     controlling movement of the arm during a work operation cycle to perform the predetermined work operations with respect to the workpiece in accordance with the workpiece position and the stored command signals.

25. The method of claim 24 further comprising the step of:

interpolating between said stored command signals to develop manipulator arm command signals, the interpolation accomplished between stored command signals representing workpiece positions on either side of the actual workpiece position in the work operation cycle.

26. The method of programming and controlling the operation of a programmable manipulator provided with an arm movable in a plurality of axes and having an encoder for each axis developing position signals to perform a predetermined work operation with respect to a workpiece whether the workpiece is continuously moving along a predetermined path or is stationary at any position along the predetermined path, the workpiece being provided with an encoder to develop position signals, the method comprising the steps of:

moving said arm during a teaching operation to different positions with respect to the workpiece to describe the predetermined work operation with respect to the workpiece at one or more positions of the workpiece along the predetermined path;

storing the encoder signals developed during the teaching operation in a predetermined relationship with respect to the corresponding workpiece positions; and     controlling movement of the arm during a work operation cycle to perform the predetermined work operation with respect to the workpiece in accordance with the actual workpiece position and the signals stored during the teaching operation.

27. The method of programming and controlling the operation of a programmable manipulator provided with an arm movable in a plurality of controllable axes and having encoder means for the axes developing position signals representing the actual position of the arm in the plurality of axes to perform a predetermined series of operations with respect to a workpiece whether the workpiece is continuously moving along a predetermined path or is stationary, the method comprising the steps of:

moving the arm during a first teaching operation to describe a predetermined series of operations to be performed with respect to the workpiece at a first position of the workpiece along the predetermined path;

storing said developed encoder signals corresponding to said positions of the arm in said first teaching step;

moving the arm during a second teaching operation to describe the predetermined series of operations to be performed with respect to the workpiece at a second position of the workpiece along the predetermined path;

storing said developed encoder signals corresponding to the positions of the arm in said second teaching step; and     controlling movement of the arm during playback on a movable or stationary workpiece along the predetermined path to perform said predetermined series of operations with respect to the workpiece in accordance with said stored signals from said first and second teaching steps and the actual position of the workpiece along the predetermined path.

28. The method of programming and controlling the operation of a programmable manipulator provided with an arm movable in a plurality of controllable axes and having encoder means for the axes operative to develop position signals corresponding to the actual position of said arm in said plurality of axes to perform a predetermined series of operations with respect to a workpiece whether the workpiece is continuously moving along a predetermined path or is stationary, the method comprising the steps of:

moving the arm during a first teaching operation to different positions with respect to the workpiece at a first position of the workpiece along the predetermined path to describe a predetermined series of operations to be performed with respect to the workpiece;

storing said developed position signals corresponding to said positions of the arm in said first teaching step;

calculating command signals from the signals developed by the encoder for each axis of the manipulator arm that represent arm positions different than the positions during the teaching operation and represent the predetermined work operations with respect to the workpiece at a workpiece position different than the workpiece position during the teaching operation;

storing said calculated signals; and controlling movement of the arm during playback on a movable or stationary workpiece along the predetermined path to perform said predetermined series of operations with respect to the workpiece in accordance with said stored calculated signals and the actual position of the workpiece along the predetermined path.

29. In a programmable manipulator having a manipulator arm movable in a plurality of axes, control apparatus for controlling the movement of the manipulator arm to describe a predetermined work operation with respect to a workpiece capable of movement along a predetermined path, the control apparatus controlling the manipulator arm to describe the predetermined work operation with respect to the workpiece while the workpiece is moving or is stationary at any position along the predetermined path, said control apparatus comprising:

means for storing two or more series of command signals, each of said command signals representing the position of the manipulator arm in the plurality of axes, each of said series of command signals representing the same series of points along the predetermined work operation with respect to the workpiece at respective positions of the workpiece;

means for generating a workpiece position signal representing the position of the workpiece along the predetermined path;

means responsive to said workpiece position signal generating means for controlling the read-out of command signals from the two series of command signals that correspond to the two respective workpiece positions on either side of the workpiece position as represented by said workpiece position signal;

means responsive to said two series of command signals and said workpiece position signal for generating interpolation control signals accounting for workpiece position;

means for controlling said interpolation signal generating means to successively interpolate between said two series of command signals along said series of points; and means responsive to said interpolation control signals for moving said manipulator arm.

30. In a programmable manipulator having a fixed base and a manipulator arm movable in a plurality of axes, control apparatus for controlling movement of the end of said arm along a desired path with respect to a moving workpiece, said control apparatus comprising:

means for storing two or more series of command signals, each of said command signals representing the position of said arm in said plurality of axes and the command signals in different ones of said series corresponding to the same sequence of points along said desired path but at different locations of said workpiece relative to said fixed base, means for generating a workpiece position signal representing the position of the workpiece relative to said fixed base, and means jointly responsive to said workpiece position signal and two of said stored series of command signals for moving the end of said manipulator arm over said desired path as the workpiece is moved relative to said fixed base.

* * * * *